P. MacGAHAN.
ELECTRICAL MEASURING SYSTEM.
APPLICATION FILED APR. 29, 1915.
1,258,030.
Patented Mar. 5, 1918.
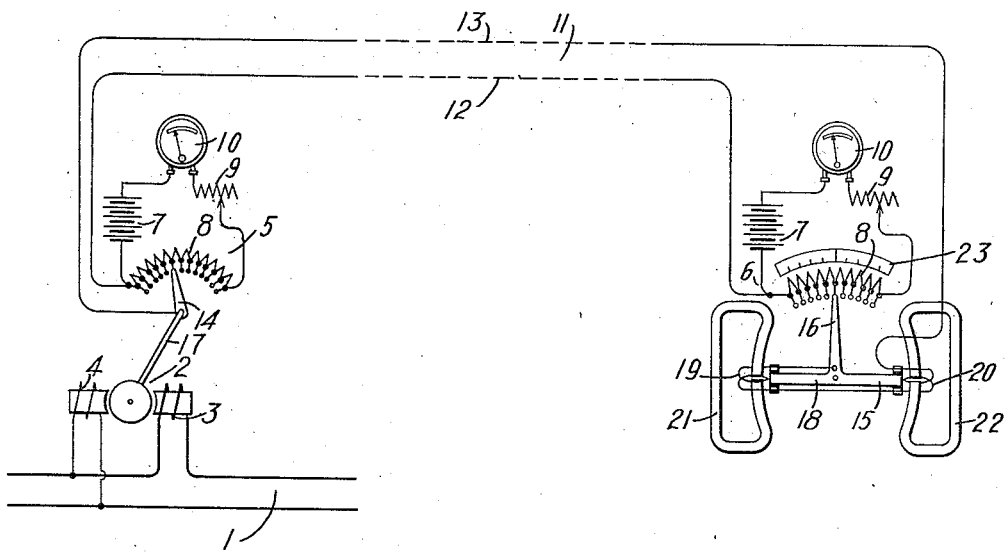
WITNESSES:
Fred. A. Lind.
J. H. Procter
INVENTOR
Paul MacGahan
BY
Wesley G. Carr
ATTORNEY

UNITED STATES PATENT OFFICE.

PAUL MACGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING SYSTEM.

1,258,030.            Specification of Letters Patent.      Patented Mar. 5, 1918.

Application filed April 29, 1915. Serial No. 24,706.

*To all whom it may concern:*

Be it known that I, PAUL MACGAHAN, a citizen of the United States, and a resident of Pittsburgh, in the county of Allegheny and State of Pennsylvania, have invented a new and useful Improvement in Electrical Measuring Systems, of which the following is a specification.

My invention relates to electrical measuring systems and particularly to means for measuring the voltage, the current, or the energy traversing a system at a point remotely disposed with respect to the place where the measuring instrument is located.

The object of my invention is to provide a device of the above-indicated character that will operate correctly irrespective of the length of the pilot wires that are used for transmitting the energy between the various devices constituting the measuring system.

It is frequently necessary to determine the amount of energy used by a customer and it is preferable, in some instances, to measure this energy at the customer's switchboard. In order that indications of the amount of energy consumed by the customer may be apparent at the central station, I provide two potentiometer circuits and a pilot transmission circuit for connecting the two. I provide also an electrical measuring instrument that varies the connection between one potentiometer circuit and one end of the transmission circuit in accordance with the energy being measured, and I cause the current that traverses the transmission circuit to so vary the connection between the other end of the transmission circuit and the other potentiometer circuit that the potentials impressed across the transmission circuits at its respective ends will be equal and opposite. Thus, no current traverses the transmission circuit after a balance is reached and, no matter how long the transmission circuit is, it will not affect the indications of the instrument.

The single figure of the accompanying drawing is a diagrammatic view of a measuring system embodying my invention.

If it is desired to indicate, at a power house or any other conveniently located place, the energy traversing an electric circuit 1, that is remotely disposed with respect to the power house, I provide an electrical measuring instrument 2 having a current winding 3 and a voltage winding 4. I provide also two potentiometer circuits 5 and 6, one of which is located adjacent to the electrical measuring instrument 2 and the other of which is located at the power house where the indications are desired.

The potentiometer circuits 5 and 6 severally comprise a source of electromotive force 7, a resistor 8, a variable resistor 9 and an ammeter 10. The ammeter 10 and the variable resistor 9 are utilized for the purpose of maintaining a constant-potential drop across the resistor 8. A transmission circuit 11, which may be an ordinary telephone circuit, comprises two conductors 12 and 13. One end of the conductor 12 is connected to one terminal of the resistor 8 of the potentiometer circuit 5 and the other terminal of the conductor 12 is connected to one terminal of the resistor 8 of the potentiometer circuit 6. One terminal of the conductor 13 is connected to a movable contact member 14 and the other terminal of the conductor 13 is connected to one terminal of a direct-current measuring instrument 15 the other terminal of which is connected to a movable contact member 16 that constitutes a part of the measuring instrument 15.

The electrical measuring instrument 2 is adapted to so actuate the movable contact member 14, through a shaft 17, that the contact member 14 engages different points on the resistor 8, in accordance with the energy being transmitted through the circuit 1.

The electrical measuring instrument 15 comprises a pivotally mounted arm 18 that is operatively connected to the movable contact member 16 and has disposed thereon two oppositely disposed windings 19 and 20 which are acted upon by stationary permanent magnets 21 and 22, respectively. The movable contact member 16 serves as an indicator to coöperate with a scale 23 for indicating the energy that traverses the circuit 1.

When energy traverses the circuit 1, the armature of the measuring instrument 2 is turned to cause the movable contact member 14 to advance and thus impress, across the transmission circuit 11, a potential that is proportional to the energy traversing the circuit 1. Since the circuit 11 is closed and a voltage is impressed thereon, current will traverse the same that is proportional to the energy traversing the circuit 1. When the current traverses the windings 19 and 20, the member 18 is caused to turn the movable contact member 16 to such a position that the potential impressed across the power-house end of the circuit 11 is substantially equal and opposite to the potential impressed across the other end. Thus, current ceases to traverse the circuit 11, and the contact member 16 indicates, in coöperation with the scale 23, the energy that traverses the circuit 1.

If the amount of energy traversing the circuit 1 decreases, the potential across the circuit 11 at the power house end will be greater than at the other end and the current that traverses the windings 19 and 20 will be reversed, thus causing the contact member 16 to move backwardly until the voltages impressed across the ends of the circuit 11 will be equal and opposite. The movable contact member 16 will then indicate on the scale 23 the amount of energy traversing the circuit 1. Thus, for every variation of the energy traversing the circuit 1, the movable contact member 16 is caused to move to such position that no current traverses the circuit 11, and the indications of the device are correct, irrespective of the length of the conductors 12 and 13.

While I have shown certain specific devices for the carrying-out of my invention, it will be understood that various modifications may be made, both in its application and its construction, without departing from the spirit and scope of my invention as set forth in the appended claims.

I claim as my invention:

1. An electrical system comprising a transmission circuit, two constant-potential circuits, an electro-responsive device for changing the connections between one end of the transmission circuit and one constant-potential circuit and means dependent upon the current that traverses the transmission circuit for so connecting the other end of transmission circuit to the other constant-potential circuit that no current traverses the transmission circuit.

2. A measuring system comprising an electric circuit the energy traversing which is to be measured, a transmission circuit, a potentiometer circuit at each end of the transmission circuit, a measuring instrument actuated in accordance with the energy traversing the electric circuit and having means for changing the connections between the potentiometer circuit and one end of the transmission circuit, and electro-responsive means dependent upon the current that traverses the transmission circuit for changing the connection between the other end of the transmission circuit and the other potentiometer circuit.

3. A measuring system comprising an electrical circuit the energy traversing which is to be measured, a transmission circuit, two potentiometer circuits, an electrical measuring instrument operatively connected to the electrical circuit and having means for connecting one end of the transmission circuit to different points on one potentiometer circuit and means actuated by the current that traverses the transmission circuit for so connecting the other end of the transmission circuit to such points on the other potentiometer circuit that no current traverses the transmission circuit.

4. In an electrical circuit, the combination with two potentiometer circuits severally comprising a source of constant potential and a resistor, of a transmission circuit, an electrical measuring instrument operatively connected to the electrical circuit and having means for connecting one end of the transmission circuit to a portion of one of the resistors that varies in accordance with the energy traversing the electrical circuit, and means actuated by the current that traverses the transmission circuit for connecting the other end of the transmission circuit to such portions of the other resistor that no current traverses the transmission circuit.

5. A measuring system comprising a transmission circuit, two potentiometer circuits, electro-responsive means for connecting the conductors at one end of the transmission circuit to points of different potential on one potentiometer circuit, and means dependent upon the current that traverses the transmission circuit for so connecting the conductors on the other end of the transmission circuit to the other potentiometer circuit that no current traverses the transmission circuit.

6. In an electrical system, the combination with two potentiometer circuits, of two transmission conductors, means for connecting one end of the transmission conductors to points of different potential in one potentiometer circuit, and means actuated in accordance with the current that traverses the transmission conductors for so connecting the other ends of the transmission conductors to the other potentiometer circuit that no current traverses the transmission conductors.

7. The combination with two potentiometer circuits, of means for connecting two equal-potential points on the said circuits together, a conductor, means for connecting one end of the conductor to points on one potentiometer circuit in accordance with predetermined conditions, and means depending upon the current that traverses the conductor for so connecting it to a point in the other potentiometer circuit that no current traverses the conductor.

8. A measuring system comprising an electric circuit the energy traversing which is to be measured, two constant-potential circuits, means for connecting two equal-potential points on the said constant-potential circuits together, a conductor, means for connecting one end of the conductor to points of different potential on one circuit in accordance with the energy traversing the electric circuit, electro-responsive means dependent upon the current traversing the conductor for connecting its other end to such point on the other constant-potential circuit that no current traverses the conductor and means for indicating the movement of the electro-responsive means.

In testimony whereof, I have hereunto subscribed my name this 20th day of April 1915.

PAUL MacGAHAN.